US007436687B2

(12) United States Patent
Patel

(10) Patent No.: US 7,436,687 B2

(45) Date of Patent: Oct. 14, 2008

(54) INTELLIGENT DIRECT CURRENT POWER SUPPLIES

(75) Inventor: Paritosh D. Patel, Parkland, FL (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/087,135

(22) Filed: Mar. 23, 2005

(65) Prior Publication Data

US 2006/0214510 A1 Sep. 28, 2006

(51) Int. Cl.
*H02M 1/10* (2006.01)
*H02J 1/10* (2006.01)

(52) U.S. Cl. ....................................................... 363/142

(58) Field of Classification Search ................... 363/84, 363/125, 142; 307/18–22, 24, 25, 26, 31, 307/35, 38–41, 52, 60, 62, 72, 75, 85, 86
See application file for complete search history.

(56) References Cited

U.S. PATENT DOCUMENTS 5,191,520 A * 3/1993 Eckersley .................... 363/72
5,297,015 A 3/1994 Miyazaki et al.
5,347,211 A 9/1994 Jakubowski
6,091,611 A 7/2000 Lanni
6,172,884 B1 * 1/2001 Lanni ...................... 363/21.05
6,172,891 B1 1/2001 O'Neal et al.
6,266,261 B1 7/2001 Lanni
6,512,682 B2 1/2003 Cohen et al.
6,628,535 B1 9/2003 Wu
6,937,490 B2 * 8/2005 MacDonald et al. ........ 363/142
7,072,189 B2 * 7/2006 Kim et al. ..................... 363/16
7,131,013 B2 * 10/2006 Sasakura et al. ............ 713/300

* cited by examiner

*Primary Examiner*—Matthew V. Nguyen
(74) *Attorney, Agent, or Firm*—Akerman Senterfitt

(57) ABSTRACT

A power supply including a power supplying connector, a direct current (DC) connector, an information extractor, power adaptor electronics, and variable voltage electronics. The information extractor being configured to extract digitally encoded data from a carrier wave. The digitally encoded data can specify power requirements of the DC power receiving device. The variable voltage electronics can adapt DC power generated by the power adaptor in accordance with settings provided by the information extractor. This adapted power can be provided to the DC power receiving device connected to the power supply via the DC connector.

7 Claims, 3 Drawing Sheets

100

150

INTELLIGENT DIRECT CURRENT POWER SUPPLIES

BACKGROUND

1. Field of the Invention

The present invention relates to the field of powering direct current (DC) devices and, more particularly, to a method and system for intelligently supplying DC power to devices in accordance with device supplied power requirements.

2. Description of the Related Art

Digital consumer electronic devices have been proliferating at an astonishing rate. It is presently commonplace for a consumer to have many of these devices, often operating at the same time. Examples of digital consumer electronic device include, but are not limited to, mobile telephones, portable music devices, digital cameras, personal data assistants, speakers, media center hubs, audio-video equipment, scanners, printers, monitors, joysticks, and battery charging devices. As prices for these devices continue to fall, capabilities rise, and consumer demand increases, it is expected that the sales and use of these devices will only increase in the future, perhaps at a geometric growth rate.

The majority of the aforementioned digital consumer electronic devices operate by consuming relatively low quantities of direct current (DC) power, yet have power requirements large enough to make exclusive reliance upon batteries a non-viable option. Portable versions of these devices often rely upon both batteries for portable use and DC power, typically supplied via a power-adapted alternating current (AC) source or by power supplied via a direct current (DC) source that may be DC-to-DC power converted to match the power requirements of the target device, to operate at a stationary location and to recharge the battery. Because many of these devices can be communicatively linked to a computer or media center hub, and can therefore be proximately located to one another, providing sufficient power outlets for these devices can be problematic. Further, having large quantities of power cables, each configured specifically for a particular device, can result in cable management problems, can be a fire hazard, can obstruct pathways, and can cause consumer confusion.

Many device power issues relate to each device having different, and generally incompatible, power requirements. Occasionally, connectors for each device can have different physical dimensions, to prevent the wrong connector from being connected to the wrong device. Mating different DC connectors to appropriate devices can be challenging and frustrating to device users, especially to traveling users that must repetitively set-up and tear down their device infrastructure.

Other times, DC connectors can fit an incorrect receptacle for the wrong device. When a DC connector has been incorrectly inserted, the device may operate properly from a user perspective, though the power requirement differences can degrade the device. Alternatively, the device can fail to receive sufficient power to turn on. In other situations, the device mated with an incorrect power connector can either damage internal electronic components of the device, thereby rendering the device inoperative, or can blow an inline fuse or circuit breaker of the device.

A number of attempts have been made to alleviate the problems associated with conventional DC power supplies, each having shortcomings. One solution provides a single power supply with manually adjustable settings, with different settings causing the power supply to conform to different power requirements. An extension of this concept provides several DC connectors, which a user can selectively connect to the manually adjustable power supply, with each connector matching a particular DC receptacle standard. Most consumers, however, lack the knowledge or patience to correctly perform these manual setting adjustments.

An even further extension of this concept is to key the various DC connectors to corresponding power settings so that when a connector is selectively attached to the power supply, the power supply settings are automatically configured in accordance to the keyed connector. This solution still requires a user to correctly attach a proper DC connector, which can lead to errors. Additionally, the various keyed DC connectors can be small items, which are easily lost, left unpacked, or misplaced.

Other solutions require different, but still intrusive, user-connector manipulations and/or manual setting adjustments. Still other solutions involve non-standard power outlets and power supply sources to be used to power the consumer devices, require additional data communication lines be connected to power regulating electronics over and above a power line so that an external data source can convey device power requirements to the power regulating electronics, and have other substantial shortcomings. Additionally, many of these solutions fail to overcome problems relating to having too many power cords for the number of available power outlets, a problem which often directly results in cable management and pathway obstruction challenges.

SUMMARY OF THE INVENTION

The present invention details a system, method, and apparatus that intelligently provides DC power to devices in accordance with an embodiment of the inventive arrangements disclosed herein. The DC power provided by the present invention can be adapted power obtained from an AC source or can be DC-to-DC converted power obtained from a DC source. More specifically, the present invention teaches an intelligent power supply that automatically communicates with corresponding intelligence on the device-side to dynamically provide proper power requirements to the device. In one embodiment, since the power requirements are adjusted for the device based upon device provided information, a standard DC connector can be used for a wide variety of DC power receiving devices. Similarly, the intelligent power supply can be standardized for set ranges of power requirements, thereby alleviating the need for manufacturers to produce, stock, and ship different device-specific power supplies. In one embodiment, a single intelligent power supply can provide power to two or more different consumer devices, each potentially having different power requirements.

The disclosed subject matter taught herein provides a variety of advantages over conventional solutions for providing DC power. For example, the present invention teaches a standardized power supply that can benefit travelers by granting them the ability to pack a single intelligent power supply which can be used to power multiple devices. The intelligent power supply also ameliorates customer confusion pertaining to powering DC devices, which can be particularly advantageous to common consumer electronic device users. Further, the presented solution can power multiple devices from a single power source, minimizing power cable management problems and problems of power outlet scarcity.

The invention disclosed herein can be implemented in accordance with a variety of different aspects, the scope of protection for these various aspects being defined by the claim section included herein. For example, one aspect of the present invention discloses a power supply. The power supply can include an alternating current (AC) connector, a direct current (DC) connector, an information extractor, power adaptor electronics, power converter electronics, and/or variable voltage electronics. The information extractor is configured to extract digitally encoded data from a carrier wave. The digitally encoded data can specify power requirements of the DC power receiving device. The power adaptor electronics can convert power received from an AC source connected to the AC connector into DC power. The power converter electronics can convert power received from a DC source into DC power. The variable voltage electronics can adapt DC power generated by the power adaptor electronics or power converter electronics in accordance with settings provided by the information extractor. This power can be provided to the DC power receiving device connected to the power supply via the DC connector.

Another aspect of the present invention can include a DC power receiving device. The DC power receiving device can include a data store, a DC power receptacle, and a communication mechanism. The data store can include data that specifies power requirements for the DC power receiving device. The DC power receptacles can receive DC power from a dynamically adjustable power supply that supplies the DC power from a power source. The communication mechanism can provide the power requirements to the dynamically adjustable power supply. The dynamically adjustable power supply can be configured to provide power conforming to two or more devices, each device having different power requirements. Power supplied by the adjustable power supply can approximately conform to the power requirements conveyed by the communication mechanism.

Still another aspect of the present invention can include a method for providing direct current (DC) power. According to the method, a power source connector configured to be connected to a power source can be identified. A DC connector configured to be connected to the DC power receiving device can also be identified. A digitally encoded signal can be received from the DC power receiving device. Data can be extracted from the digitally encoded signal data that specifies power requirements for a DC power receiving device. Electronics can be automatically adjusted in accordance with the power requirements. Power can be provided via the DC connector to the DC power receiving device that is supplied by the power source through the power source connector. The provided power can approximately conform to the power requirements.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
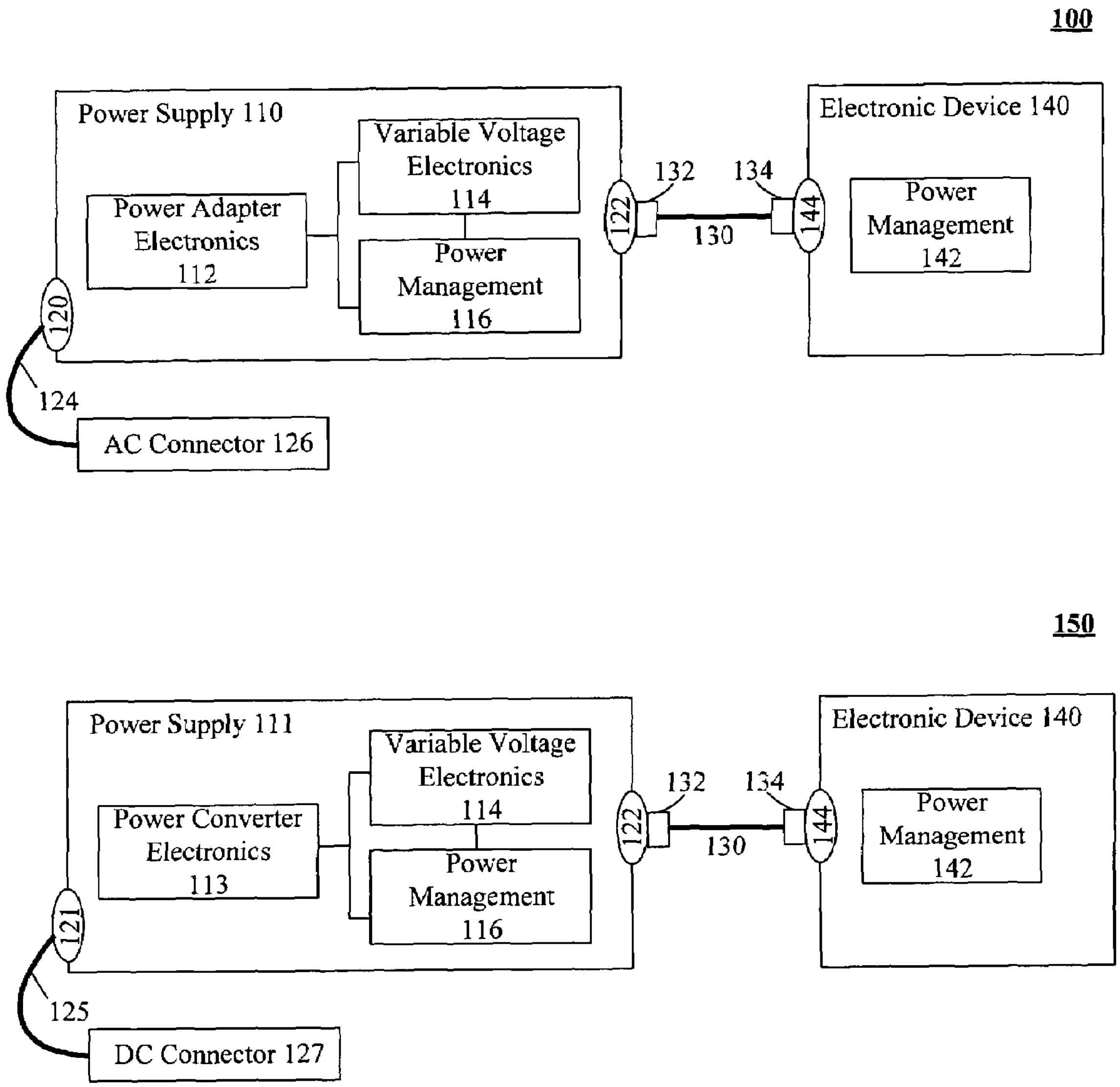
FIG. 1 is a schematic diagram illustrating a system for providing DC power in accordance with an embodiment for the inventive arrangements disclosed herein.

FIG. 1 is a schematic diagram illustrating a system 100 and system 150 for providing DC power in accordance with an embodiment for the inventive arrangements disclosed herein. It should be appreciated that power supplied to an electronic device 140 can originate from either an AC source or a DC source. System 100 and system 150 differ in that in system 100 power is supplied by an AC source and in system 150 power is supplied by a DC source. Thus, the system 100 can include power supply 110 having power adaptor electronics 112 and system 150 can include power supply 111 having power converter electronics 113.

The electronic device 140 can be any electronic device that receives DC power such as a portable computing device, a computer, a peripheral, an audio/video component, a communication device, and the like. For example, various contemplated electronic devices 140 can include, but are not limited to, mobile telephones, portable music devices, digital cameras, personal data assistants, speakers, media center hubs, audio-video equipment, scanners, printers, monitors, joysticks, and battery charging devices.

The electronic device 140 can include power management electronics 142 that manage the power requirements from the device. The power management electronics 142 can utilize DC power supplied by the power supply 110, power supply 110, battery power from a battery source local to the electronic device 140, or a combination of various power sources to power the electronic device 140. In embodiments where a battery source can be utilized to power the electronic device 140, the power management electronics 142 can re-charge the battery source using power provided by the power supply 110 or power supply 111, when available. The power management electronics 142 can also include digitally encoded data specifying power specifications for the electronic device 140.

The power supply 110 can include power adaptor electronics 112, variable voltage electronics 114, and power management electronics 116. The power management electronics 116 can receive digitally encoded data conveyed from the power management component 142 of the electronic device 140. Based upon the received digitally encoded data, the power management component 142 can automatically adjust configurable parameters of the variable voltage electronics 114 to match output produced by the variable voltage electronics 114 to the power specifications conveyed within the received digitally encoded data.

In one embodiment, the power management electronics 116 can provide additional power management features that can be advantageously utilized by the power supply 110, power supply 111, and/or the electronic device 140. For example, the power management electronics 116 can include one or more fuses or circuit breakers so that power surges do not burn out electronic components. In another example, the power management electronics 116 can include a battery or other power store that can provide uninterrupted power supply (UPS) capabilities to the electronic device 140 as well as power clipping or filtering capabilities.

The power adaptor electronics 112 can include components that receive AC power from an AC source and convert, transform, or otherwise adapt the received power into DC power. The resulting DC power can be conveyed to the variable voltage electronics 114. The variable voltage electronics 114 can include numerous configurable electrics that can, within a design range, adjust the current and voltage that is provided to the electronic device 140.

The power supply 110 can be connected to an AC source via receptacle 120 communicatively linked to AC connector

126 through power line 124. The AC connector can be a standard connector for coupling to standard AC outlets, like a 110V or 220V AC outlet, or can be a customized connector for coupling to other less-standard AC outlets.

The power supply 111 can include power converter electronics 113, variable voltage electronics 114, and power management electronics 116. The power converter electronics 113 can step-up, step-down, or invert an input voltage thereby converting power from a DC source to a desired voltage and current level. Power output by the power converter electronics 113 can be further processed by the variable voltage electronics 114 and/or the power management electronics 116.

The power supply 111 can be connected to a DC source via receptacle 121 communicatively linked to DC connector 127 through power line 125. The DC power provided to the power supply 111 can be supplied through various technologies including, but not limited to, battery technologies, solar power technologies, fuel cell technologies, and flywheel technologies. Any of a variety of different DC connectors 127 can be utilized to connect to different DC outlets, such as an automobile 12 Volt connector (cigarette lighter), an airline in-seat DC connector, a USB connector, a DC connector linking power supply 111 to a powered computer (causing the computer to function as a DC power source), and the like.

The power supply 110 or power supply 111 can be connected to the electronic device 140 over line 130, which includes a power line for conveying DC power to the electronic device 140. In one embodiment, the line 130 can also include a data line for communicating digitally encoded data, such as power requirements, between the electronic device 140 and the power supply 110 or power supply 111. In another embodiment, digitally encoded information can be conveyed across a power carrying line, using a power line communication protocol. In still another embodiment, the digitally encoded information can be wirelessly conveyed between the electronic device and the power supply 110 or power supply 111 utilizing a carrier wave. For example, WIFI (802.11 protocols), BLUETOOTH®, infrared, and other wireless communication protocols and technologies can be used to convey the digitally encoded information between the electronic device 140 and the power supply 110 or power supply 111.

The line 130 can terminate in connector 132 that is insertable into receptacle 122 of power supply 110 or power supply 111. The opposite end of line 130 can terminate in connector 134 that is paired to receptacle 144. In one embodiment, the connector 134 and receptacle 144 can be standardized so that power supply 110 or power supply 111 can connect to any of a variety of electronic devices that conform to the standard. This is possible even though these devices can have different power requirements, since each device can convey these requirements within a digitally encoded signal to power supply 110 or power supply 111 over line 130, which can utilize the variable voltage electronics 114 to customize the provided DC power to the received power requirements. In a further embodiment, the connector 132 and conforming receptacle 122 can adhere to an established standard, so that the cable including line 130, connector 132, and connector 134 can be a standardized cable that can be used to connect any intelligent power supply 110 or power supply 111 to any conforming electronic device 140.

A number of protocols and techniques can be utilized in conjunction with the system 100 to ensure power can be provided to the electronic device 140 in a standardized and safe fashion. These protocols and techniques can be directed towards start-up procedures, termination procedures, and the like.

For example, it should be evident that in order for a communication of power requirements to occur, the electronic device 140 and power supply 110 must both be "powered". The power supply 110 can be powered when the AC connector 126 is connected to an AC source. The electronic device 140 can include a battery or other power store that can be used to provide the requisite power to communicate the power requirements of the electronic device 140. The electronic device 140 can also be powered by the power supply 110.

Since initially the power supply 110 or power supply 111 has not been dynamically adjusted for the power requirements of the electronic device 140, a minimal power can be provided during startup. The minimal power can be designed to be less than or equal to the maximum power setting of the majority of consumer electronic devices being sold in the marketplace, and particularly those devices having a receptacle 144 into which connector 134 can be inserted. While today's electronic devices can generally safely handle voltages of 3.5 volts, future electronic devices may utilize even lower voltages, as miniaturization and power optimizing technologies improve. Consequently, the power supply 110 or power supply 111 should be sensitive to the DC power receiving electronic devices being sold on the market, especially those devices having no internal start-up power, and the minimal power should be established accordingly.

In one embodiment, the power supply 110 or power supply 111 can detect that the cable including line 130 has been inserted into receptacle 144 or receptacle 122. Responsive to the connection, the power supply 110 or power supply 111 can provide periodically stepped up voltage via line 130 until the electronic device 140 communicates an initial message indicating that electronic device 140 is receiving sufficient power for startup tasks. Once the initial message is received, the voltage increases should be stopped and a present supplied voltage should be maintained during the startup process. This maintenance voltage can be supplied until the variable voltage electronics 114 are configured to provide the power requirements specified by the electronic device 140 as determined from data within the digitally encoded signal conveyed from the electronic device 140. Additionally, the power supply 110 or power supply 111 can detect when electronic device 140 powers down, when connector 134 is detached from receptacle 144, or when connector 132 is detached from receptacle 122. Responsive to detecting any of these events, the variable voltage electronics 114 can be adjusted to stop providing power to receptacle 122.

In the embodiment above, a minimum and maximum range can be established when periodically stepping up the voltage so that if device 140 fails to respond, the power supply 110 or power supply 111 will not provide continuously increasing power over line 130, resulting in electronics of electronic device 140 being overloaded. The minimum threshold of provided voltages should be as low as possible to support predicted voltage consumptions of future devices and the maximum threshold should be established that the power supply 110 or power supply 111 is capable of supporting all currently marketed electronic devices for which the power supply 110 or power supply 111 is to be utilized.

It should be appreciated that physical electronic limitations can limit the range within which the variable voltage electronics 114 can be adjusted, so that different power supplies 110 and 111 can be manufactured, each having a different range of operation. A standardized cable including line 130, connector 132, and connector 134 can be designed to handle power transmission requirements for each of the different types of power supplies 110 and 111. Different connectors 132 and 134 can be utilized for each type of power supply 110 and 111 to assure an incorrect cable is not utilized. Additionally, different color coded schemes can be used to appropriately match cables with power supplies 110 and 111, receptacles with connectors, and so forth.

It should also be appreciated that the arrangements shown in FIG. 1 are for illustrative purposes only and that the invention is not limited in this regard. The functionality attributable to the various components of system 100 can be combined or separated in different manners than those illustrated herein. For instance, the functionality attributed to the variable voltage electronics 114 and the functionality attributed to the power management 116 component can be integrated into a single variable power management (not shown) component. In a particular embodiment, power line 124 can be directly connected to power supply 110 via a connector (not shown) inserted into receptacle 120 (not shown), or can be permanently connected to the power supply 110 (not shown) without an intervening connector. Similarly, the line 130 can be directly and permanently connected to power supply 110 instead of being detachably connected via receptacle 122 and connector 132.

Figure 2:
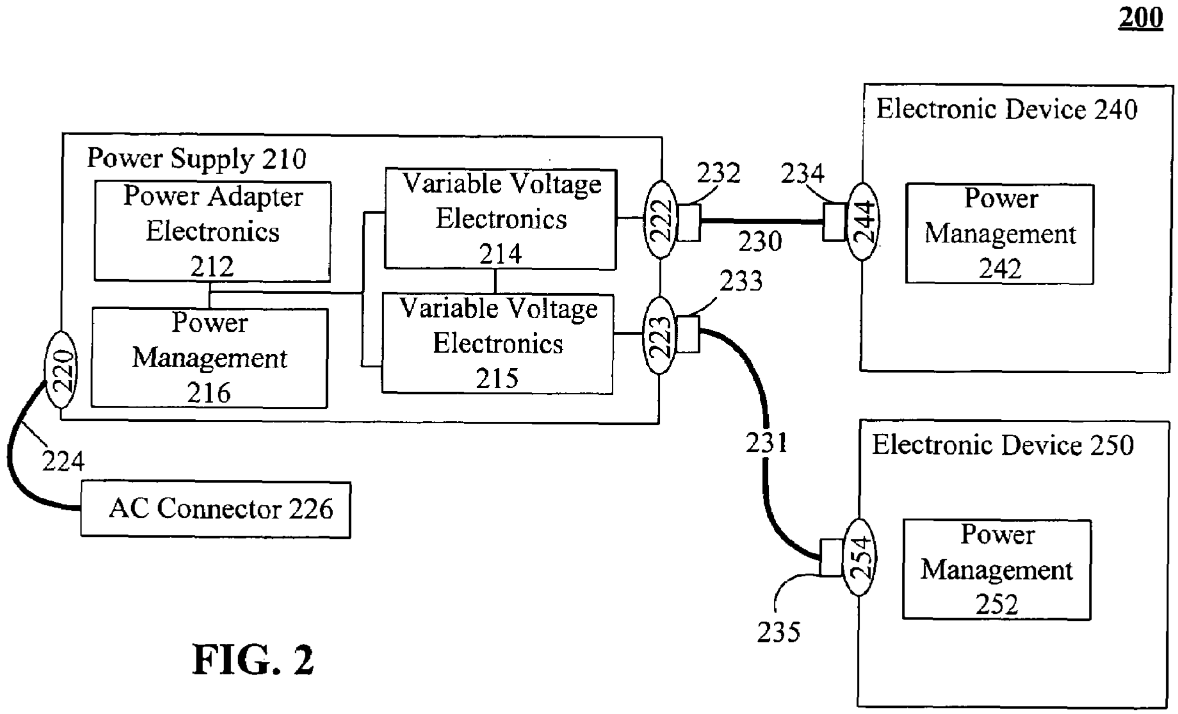
FIG. 2 is a schematic diagram illustrating a system for providing DC power in accordance with an embodiment-of the inventive arrangements disclosed herein.

FIG. 2 is a schematic diagram illustrating a system 200 for providing DC power in accordance with an embodiment of the inventive arrangements disclosed herein. Components of system 200 can be largely analogous to components of system 100. Although an AC source configuration is shown in system 200, a DC source configuration is also contemplated herein.

System 200 shows that a single power supply 210 connected to a single AC source (or DC source, which is not shown) can provide DC power to multiple electronic devices 240 and 250 simultaneously. In one embodiment, a number of receptacles 222 and 223 can be linked to variable voltage electronics 214 and 215 associated with a specific receptacle. The variable voltage electronics 214 and 215 assure that the DC power is suitably adjusted for power requirements of electronic device 240 and 250 in accordance with received digitally encoded data that specifies each device's power requirements.

Design derivatives of system 200 are contemplated herein, and the system 200 is not to be limited to the exact structures illustrated. For example, in one contemplated embodiment, a single variable voltage electronics component can support multiple devices, and can be used in place of variable voltage electronics 214 and 215. In another example, a single cable can be attached to power supply 210 that has multiple device connectors, which can include connectors 234 and 235. In such an example, a single connector and receptacle can take the place of connectors 232 and 233 and receptacles 222 and 223. Derivates described above for system 100 also apply to system 200. For example, in one contemplated arrangements lines 230 and 231 can be directly and permanently connected to power supply 210 instead of being detachably connected as shown.

System 200 is not to be construed as limited to supplying power for any particular number of electronic devices 240 and 250. Hardware constraints, however, can be a limiting factor which needs to be taken into consideration during a design and manufacturing process for intelligent power supplies 210. For example, the more devices supported by a single power supply 210, the greater the potential power consumption, requiring higher power outputting components.

Also, the operational range supported by the power supply 210 can be more limited as a single power supply 210 supports multiple devices, as it can be easier to support power requirements for devices approximately similar to one another. For example, in one contemplated embodiment, the power supply 210 can be designed to support a wide range of power requirements when supporting a single electronic device 240, but when supporting multiple devices, a more limited range of power requirements can be supported. In one embodiment, only devices having identical power requirements may be supportable simultaneously by power supply 210.

Figure 3:
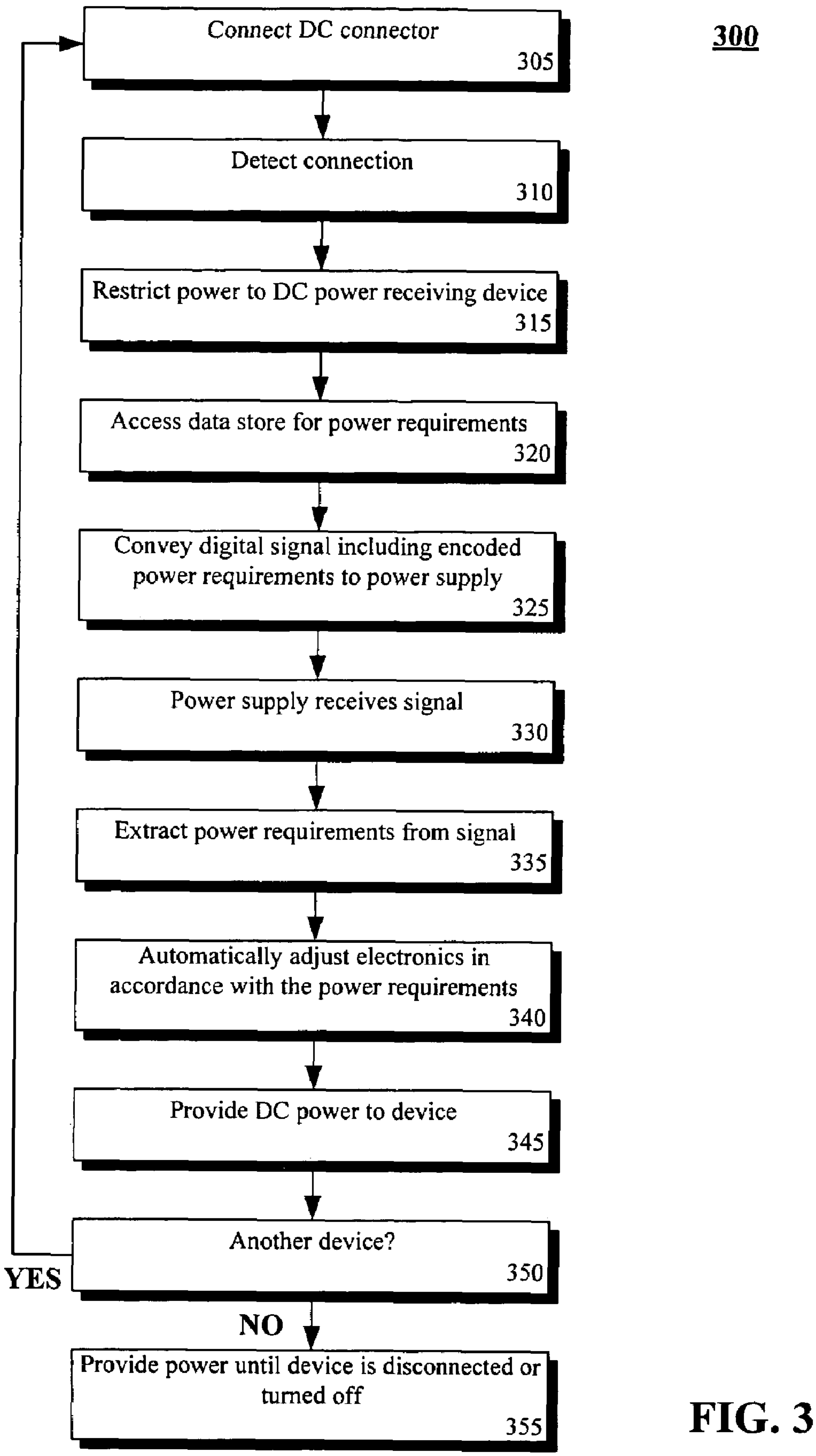
FIG. 3 is a flow chart of a method for providing DC power in accordance with an embodiment of the inventive arrangements disclosed herein.

FIG. 3 is a flow chart of a method 300 for providing DC power in accordance with an embodiment of the inventive arrangements disclosed herein. In one scenario, method 300 can be performed in the context of a system 100 and/or system 200. Method 300 is not, however, to be construed as limited in this regard and can be performed in the context of any system in which an AC or DC source is used to provide DC power to one or more electronic devices. For the method, a power supply having power adaptor electronics can connect an AC source with the DC power receiving device or a power supply having power converting electronics can connect a DC source with the DC power receiving device.

The method 300 can begin in step 305, where the DC connector can be connected to the DC power receiving device. In step 310, the connection can be automatically detected. In optional step 315, power provided to the DC power receiving device can be initially restricted to protect the DC power receiving device from receiving excessive power, which can prevent harm to sensitive electronic components. In step 320, a data store within the DC power receiving device can be accessed that includes data specifying power requirements of the device. In step 325, a digital signal encoding the power requirements can be conveyed between the DC power receiving device and the power adaptor or power converting electronics. The conveyance can occur wirelessly, or via a line. When the line is a power line, a power line communication protocol can be used, when the line is a data line, any of a variety of data communication protocols and/or digital information conveyance techniques can be utilized. In one notable embodiment, a low current can be conveyed to the DC power receiving device to permit the DC power receiving device to access the power requirements and convey the requirements to the power adaptor electronics during startup.

In step 330, the power adaptor or power converting electronics can receive the digitally encoded signal. In step 335, data specifying power requirements can be extracted from the digitally encoded signal. In step 340, electronics can be automatically adjusted in accordance with the power requirements. In step 345, power supplied by an AC source through the AC connector can be provided to the DC power receiving device through a line terminating in the DC connector. Alternately, power supplied by a DC source can be provided through the line terminating in the DC connector. The supplied power can approximately conform to the received power requirements.

Approximately conforming signifies that the conformance between the provided power and the requested power is within a safe tolerance range. In one embodiment, the safe tolerance range can be fixed at design time for various ranges of power that the power supply is configured to provide. In another embodiment, the safe tolerance range can be conveyed from the DC power receiving device as part of the power requirements. When the power adaptor electronics are incapable of providing the specified power requirements within the safe tolerance range, a warning indication can be provided.

In step 350, the method can determine whether another device is to be provided power from the power supply. If not, the method can progress to step 355, where the method can end. Step 355 represents a state where power is being provided to the DC power receiving device in a steady-state fashion. The method can be extended to dynamically adjust supplied power to the DC power receiving device throughout a power-supplying session. The method can also be extended to gradually terminate the supplied power to prevent potentially destructive power surges from occurring when the DC connector is removed. When another device is to be provided power in step 350, the method can loop from step 350 to step 305, where the new device can be connected to the power supply through another DC connector.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for providing DC power from an alternating current AC source comprising the steps of:

identifying an AC connector configured to be connected to an AC source;

identifying a DC connector configured to be connected to the DC power receiving device;

within a power supply attached between the AC connector and the DC connector, receiving a carrier wave from a DC power receiving device, wherein the carrier wave includes digitally encoded signal data specifying power requirements for the DC power receiving device;

extracting from the digitally encoded signal data specifying power requirements for the DC power receiving device;

automatically adjusting electronics in the AC source in accordance with the power requirements; and providing power via the DC connector to the DC power receiving device supplied by the AC source through the AC connector, the provided power approximately conforming to the power requirements, where approximately conforming signifies that conformance is within a previously established range.

2. The method of claim 1, wherein the carrier wave is conveyed to the power supply across a power line terminating in said DC connector in accordance with a power line communication protocol.

3. The method of claim 1, wherein the carrier wave is wirelessly conveyed to the power supply.

4. The method of claim 1, wherein the carrier wave is conveyed to the power supply over a dedicated data transmission line connected between the power supply and the DC power receiving device.

5. The method of claim 1, further comprising steps of:

automatically detecting a connection of the DC connector to the DC power receiving device; and responsive to the detecting step, automatically conveying the device-specific power requirements to the power supply.

6. The method of claim 5, further comprising the step of:

restricting power transference to the DC power receiving device until after the adjusting step is performed.

7. The method of claim 1, further comprising the steps of:

identifying another DC connector configured to be connected to another DC power receiving device;

receiving another digitally encoded signal;

extracting from the another digitally encoded signal data specifying power requirements for the another DC power receiving device;

automatically adjusting electronics in accordance with the power requirements; and providing power via the another DC connector to the another DC power receiving device supplied by the AC source through the AC connector, the provided power approximately conforming to the power requirements.

* * * * *